United States Patent
Watabe

(10) Patent No.: US 7,266,348 B2
(45) Date of Patent: Sep. 4, 2007

(54) TIRE AIR PRESSURE DETECTION SYSTEM

(75) Inventor: Nobuya Watabe, Nagoya (JP)

(73) Assignee: DENSO CORPORATION, Kariya (JP)

( * ) Notice: Subject to any disclaimer, the term of this patent is extended or adjusted under 35 U.S.C. 154(b) by 452 days.

(21) Appl. No.: 11/012,380

(22) Filed: Dec. 16, 2004

(65) Prior Publication Data

US 2005/0136843 A1    Jun. 23, 2005

(30) Foreign Application Priority Data

Dec. 19, 2003    (JP)    ............................ 2003-422065

(51) Int. Cl.
  *H04B 17/00*    (2006.01)
(52) U.S. Cl. ................. 455/67.11; 455/67.14; 455/63.1; 455/115.1; 455/91; 455/456.4; 455/214; 455/68; 455/1; 455/317; 340/442; 340/443; 73/146.5
(58) Field of Classification Search ............ 455/67.14, 455/63.1, 115.1, 91, 456.4, 214, 68, 317; 340/442, 443
See application file for complete search history.

(56) References Cited

U.S. PATENT DOCUMENTS

| | | | | |
|---|---|---|---|---|
| 6,275,148 B1* | 8/2001 | Takamura et al. | ......... | 340/442 |
| 6,330,450 B1* | 12/2001 | Wallstedt et al. | ........... | 455/447 |
| 6,430,484 B1* | 8/2002 | Takamura et al. | ............ | 701/29 |
| 6,448,892 B1* | 9/2002 | Delaporte | .................. | 340/442 |
| 6,450,021 B1* | 9/2002 | Katou et al. | ................ | 73/146.5 |
| 6,505,507 B1* | 1/2003 | Imao et al. | ................. | 73/146.5 |
| 6,604,415 B2* | 8/2003 | Imao et al. | ................ | 73/146.5 |
| 6,664,890 B2* | 12/2003 | Yamagiwa et al. | ......... | 340/442 |
| 6,817,237 B2* | 11/2004 | Katou et al. | ............... | 73/146.5 |
| 6,954,688 B2* | 10/2005 | Katou | .......................... | 701/29 |
| 6,967,571 B2* | 11/2005 | Tsujita | ........................ | 340/447 |
| 2002/0101342 A1* | 8/2002 | Yamagiwa et al. | ......... | 340/447 |
| 2003/0227379 A1* | 12/2003 | Itou | ............................ | 340/442 |
| 2004/0233049 A1* | 11/2004 | Harada et al. | .............. | 340/442 |

FOREIGN PATENT DOCUMENTS

JP    A-2002-257661    9/2002

* cited by examiner

*Primary Examiner*—Edan Orgad
*Assistant Examiner*—Amar Daglawi
(74) *Attorney, Agent, or Firm*—Posz Law Group, PLC

(57) ABSTRACT

A tire air pressure detection system, able to prevent a strong electric field or strong radio interference from affecting transmitters and causing mistaken data relating to tire air pressure to be sent out and a driver from being mistakenly warned, having transmitters with controllers, detection circuits, and sensing units and a receiver, the controllers stopping detection signals from being sent to the receiver at current transmission timings when the detection circuits detect a strong electric field or radio interference in the interval from a previous communication timing to a current communication timing, whereby even if the strong electric field or radio interference affects detection signals from sensors provided at the sensing units, the transmitters can be prevented from sending out mistaken data relating to tire air pressure.

10 Claims, 3 Drawing Sheets

TIRE AIR PRESSURE DETECTION SYSTEM

BACKGROUND OF THE INVENTION

1. Field of the Invention

The present invention relates to a direct type of tire air pressure detection system which directly attaches transmitters provided with pressure sensor to wheels to which tires are attached, has the transmitters send out detection signals from the pressure sensors, and has a receiver attached to the chassis side receive them so as to detect the tire air pressure.

2. Description of the Related Art

In the past, one type of tire air pressure detection system has been the direct type. In this type of tire air pressure detection system, the wheel side where tires are attached has transmitters provided with pressure sensors directly attached to them. The chassis side has antennas and a receiver provided at it. When detection signals from the pressure sensors are sent from the transmitters, the detection signals are received by the receiver through the antennas and the tire air pressure is detected (for example, see Japanese Unexamined Patent Publication (Kokai) No. 14-257661).

Summarizing the problem to be solved by the invention, when this direct type of tire air pressure detection system is used in an environment subjected to a strong electric field or in an environment where there is strong radio interference, the strong electric field or strong radio interference will affect the detection signals of the sensors provided at the transmitters and cause the detection signals to become mistaken in some cases. In such cases, data containing the mistaken detection signals will be sent from the transmitters resulting in poor detection accuracy of tire air pressure. For example, despite a tire air pressure being normal, data indicating an abnormality will be sent from a transmitter, whereby the receiver side will mistakenly recognize that the tire air pressure in question is abnormal and issue a mistaken warning that the tire air pressure has fallen.

To prevent such a mistaken warning, it may be considered to employ a shield structure for protecting the sensors from a strong electric field or strong radio interference, however there are limits to such a shield effect and mistaken warning would not therefore always be able to be prevented.

SUMMARY OF THE INVENTION

An object of the present invention is to provide a tire air pressure detection system able to prevent a strong electric field or strong radio interference from affecting transmitters and causing mistaken data relating to tire air pressure to be sent out and a driver from being mistakenly warned.

To attain the above object, according to a first aspect of the invention, there is provided a tire air pressure detection system having a transmitter (2) provided at each of a plurality of wheels (5a to 5d) provided with tires, having a sensing unit (21) for detecting data relating to air pressure of a corresponding tire, and sending out a detection signal of that sensing unit (21) and a receiver (3) provided at a chassis (6) side and provided with a first controller (32b) receiving detection signals and finding the air pressures of the tires provided at the plurality of wheels (5a to 5d) based on the detection signals, wherein each transmitter (2) has a strong electric field detecting means (22, 24, 25, 28) for detecting a strong electric field or strong radio interference and a second controller (22) for receiving as input the detection signal of the sensing unit (21) and sending a transmission signal toward the receiver (3) at predetermined transmission timings, and the second controller (22) is operative to stop a detection signal from being transmitted to the receiver (3) at a current transmission timing when the strong electric field detecting means (22, 24, 25, 28) detects a strong electric field or strong radio interference in the interval from a previous communication timing to a current communication timing.

By having the second controller (22) stop a detection signal from being transmitted to the receiver (3) at a current transmission timing when the strong electric field detecting means (22, 24, 25, 28) detects a strong electric field or strong radio interference in the interval from a previous communication timing to a current communication timing, even if a strong electric field or strong radio interference affects a detection signal from a sensing unit (21), it is possible to prevent the corresponding transmitter (2) from sending out mistaken data relating to the tire air pressure.

According to a second aspect of the present invention, each second controller (22) sends out a detection signal at a current transmission timing when the strong electric field detecting means (22, 24, 25, 28) fails to detect a strong electric field or radio interference from the previous transmission timing to the current transmission timing and judges that a radio wave is one transmitting a detection signal even when the strong electric field detecting means (22, 24, 25, 28) detects a strong electric field or radio interference at the current transmission timing.

By having the second controller (22) judge that a radio wave is one transmitting a detection signal even when the strong electric field detecting means (22, 24, 25, 28) detects a strong electric field or radio interference at the current transmission timing in this way, even if the radio wave sent by a transmitter (2) itself is detected as a strong electric field or radio interference, transmission of the detection signal will not be stopped.

In these cases, according to a third aspect of the invention, the receiver (3) can display by a display (4) the fact that a strong electric field or radio interference prevents detection of tire air pressure when failing to receive a detection signal from a transmitter (2) regardless of it being the current transmission timing.

According to a fourth aspect of the invention, each transmitter (2) has a radio unit (23) turned on/off upon receiving a power supply control signal from its second controller (22), the radio unit (23) being turned on when a detection signal is to be sent from the second controller (22) toward the receiver (3), and each second controller (22) is operative to output a power supply control signal turning the radio unit (23) off when the strong electric field detecting means (22, 24, 25, 28) detects a strong electric field or radio interference.

By having each second controller (22) output a power supply control signal turning the radio unit (23) off when the strong electric field detecting means (22, 24, 25, 28) detects a strong electric field or radio interference in this way, it is possible to prevent a transmitter (2) from sending mistaken data relating to tire air pressure through the radio unit (23).

According to a fifth aspect of the invention, each transmitter (2) has a strong electric field detecting means (24, 25) for detecting a strong electric field or radio interference and a second controller (22) for receiving as input a detection signal of a sensing unit (21) and sending a transmission signal toward the receiver (3) at a predetermined transmission timing, each second controller (22) operative to send dummy data different from a detection signal to the receiver (3) at a current transmission timing when the strong electric field detecting means (22, 24, 25, 28) detects a strong electric field or radio interference in the interval from the previous communication timing to the current communication timing.

By having each second controller (22) send dummy data different from a detection signal to the receiver (3) at a current transmission timing when the strong electric field detecting means (22, 24, 25, 28) detects a strong electric field or radio interference in this way, it is possible for the receiver (3) receiving the dummy data to judge that a strong electric field or radio interference has been detected and data relating to the tire air pressure cannot be sent.

In this case, according to a sixth aspect of the invention, the receiver (3) can display on a display (4) the fact that a strong electric field or radio interference prevents tire air pressure from being detected.

According to an eighth aspect of the invention, each sensing unit (21) is provided with a plurality of sensors and is designed to output detection signals from the plurality of sensors, and each strong electric field detecting means (22, 24, 25, 28) is provided with a means (22, 24, 25, 28) for changing a level by which a strong electric field or radio interference is detected in accordance with levels of resistance to a strong electric field at the plurality of sensors.

By configuring the system in this way, it is possible to judge if there is a possibility of the detection signal of a sensor being affected by a strong electric field or radio interference in accordance with the level of resistance to a strong electric field of the sensor.

Note that the reference numerals in parentheses of the means explained above show the correspondence with specific means described in the later explained embodiments.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
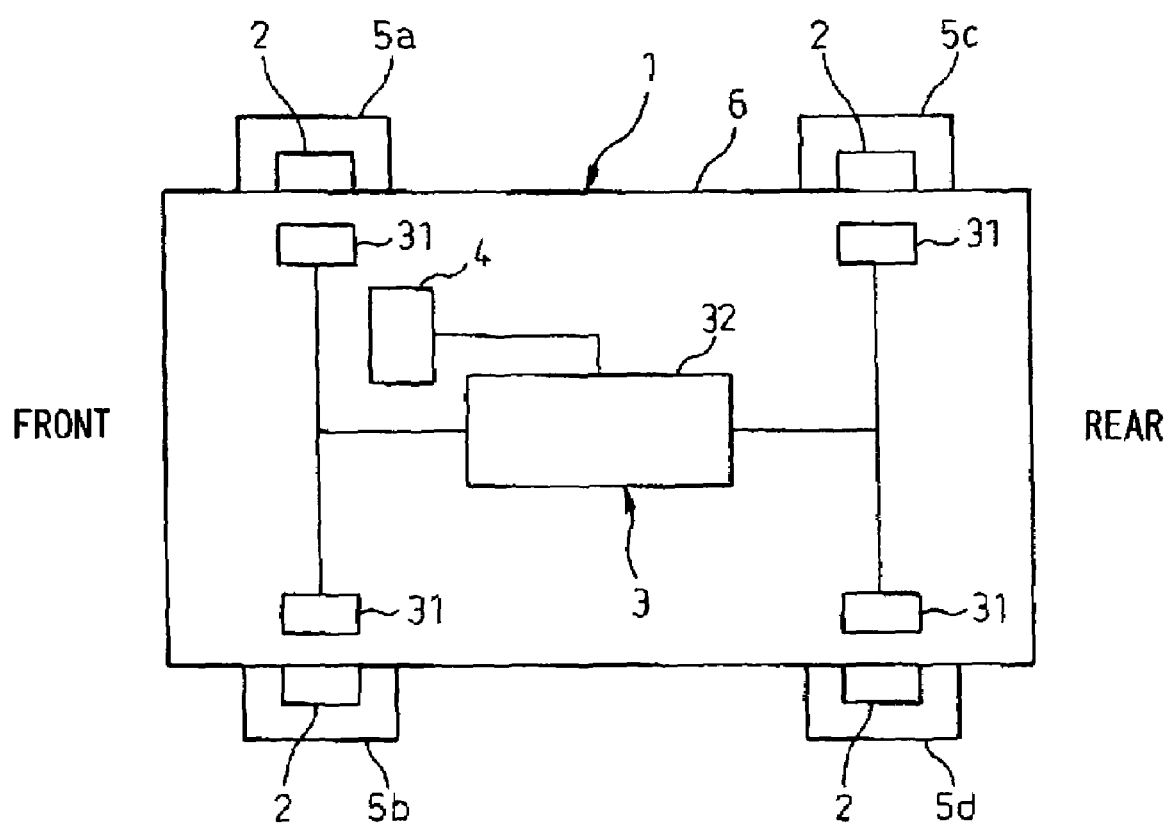
FIG. 1 is a view of the block configuration of a tire air pressure detection system according to a first embodiment of the present invention.

Preferred embodiments of the present invention will be described in detail below while referring to the attached figures. Note that in the embodiments, identical or equivalent parts are assigned the same reference numerals.

First Embodiment

Below, a first embodiment of the present invention will be explained with reference to the drawings. FIG. 1 is a block diagram of the overall configuration of a tire air pressure detection system according to a first embodiment of the present invention. The left direction of the sheet of FIG. 1 corresponds to the front of the vehicle 1, while the right direction of the sheet corresponds to the rear of the vehicle 1. Referring to this figure, the tire air pressure detection system in this embodiment will be explained.

As shown in FIG. 1, the tire air pressure detection system is attached to a vehicle 1 and is comprised of transmitters 2, a receiver 3, and a display 4.

As shown in FIG. 1, the transmitters 2 are attached to the wheels 5a to 5d of the vehicle 1. They detect the air pressures of the tires attached to the wheels 5a to 5d and store data of detection signals showing the results of detection in transmission frames for transmission. The transmitters 2 are attached to air valves of the wheels 5a to 5d for example.

Figure 2:
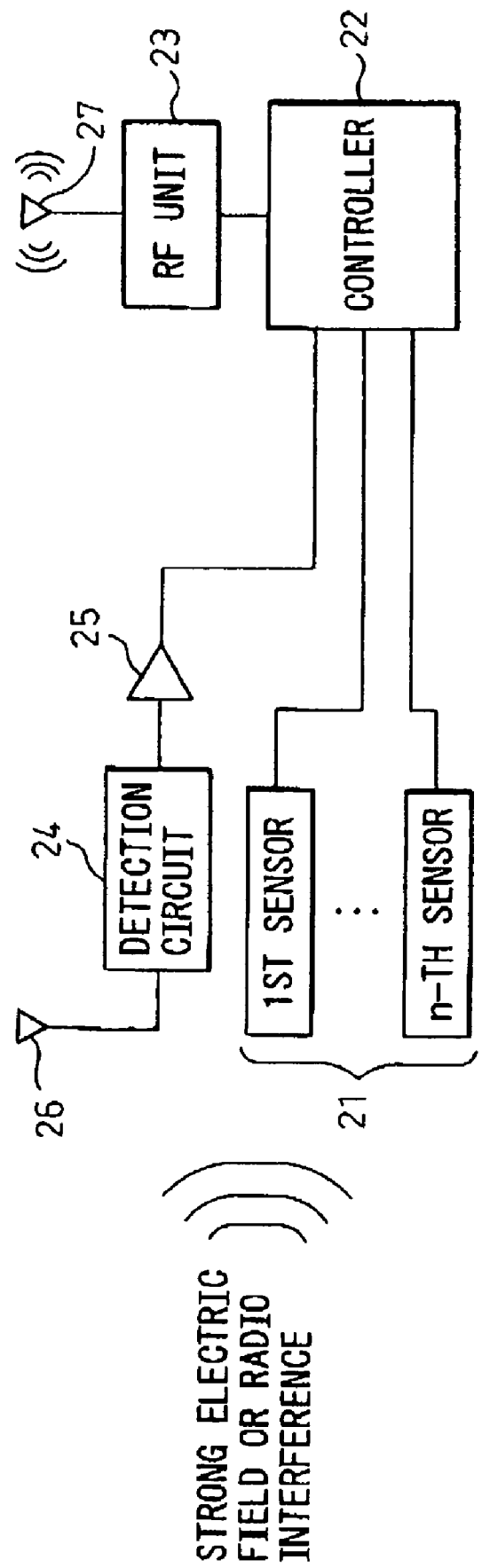
FIG. 2 is a view of the block configuration of a transmitter of the tire air pressure detection system shown in FIG. 1.

FIG. 2 shows the block configuration of a transmitter 2. As shown in this figure, each transmitter 2 is provided with a sensing unit 21, a controller (second controller) 22, a radio frequency (RF) unit 23, a detection circuit 24, an amplification circuit 25, a radio interference detection antenna 26, and a transmission antenna 27.

The sensing unit 21 is for detecting the air pressure inside the corresponding tire and is comprised of n number of (where n is any positive number) sensors, that is, a first sensor to n-th sensor, such as known pressure sensors, temperature sensors, or acceleration sensors. A pressure sensor utilizes the fact that the resistance of a piezo resistor provided at the sensing unit 21 changes in accordance with the air pressure inside the corresponding tire and outputs an electric signal corresponding to that air pressure as a detection signal. A temperature sensor outputs an electric signal corresponding to the temperature inside the corresponding tire as a detection signal. A G sensor (or rotation sensor) outputs an electric signal corresponding to the tire rotational speed as a detection signal.

The controller 22 is comprised of a known microcomputer and is designed to perform various processing based on a program stored in a not shown memory in the microcomputer. For example, the controller 22 performs processing for reading the detection signals sent from the sensors of the sensing unit 21 at timings determined for the sensors and storing the data successively in a transmission frame.

Further, the controller 22 is designed to receive the output of the detection circuit 25. When the tire air pressure detection system is exposed to an environment of a strong electric field or strong radio interference when reading sensor signals at the above timings based on this, it is designed to execute processing for dealing with the radio interference in accordance with this. Specifically, the controller 22 manages predetermined transmission timings, that is, transmission periods determined for transmission of transmission frames through the RF unit 23, and judges if it is possible to send transmission frames containing actual tire air pressure data based on the output of the amplification circuit 25 at the time of reading sensor signals. Based on the results of judgment, the controller 22 sets a power supply control signal to be sent to the RF unit 23.

The RF unit 23 functions as a radio unit for sending transmission frames through the transmission antenna 27 from the controller 22 to the receiver 3 side. The RF unit 23 is connected with the controller 22 by a signal path and power supply control line and is controlled on/off by a power supply control signal sent from the controller 22 through the power supply control line. When supplied with power and turned on, it sends transmission frames through the signal path and transmission antenna 27.

The detection circuit 24 defects strong electric field noise or strong radio interference through the radio interference detection antenna 26. For example, it shapes the radio wave input through the radio interference detection antenna 26, then outputs this signal waveform to the amplification circuit 25.

The amplification circuit 25 amplifies an analog signal sent from the detection circuit 24 and converts the analog signal to a digital signal. Due to this, when the detection circuit 24 receives as input a strong electric field noise or strong radio interference, for example, a radio wave of about 100V/m, it detects a strong electric field noise or strong radio interference and outputs a high level signal indicating that fact. Note that in this embodiment, the detection circuit 24 and the amplification circuit 25 form the strong electric field detecting means of the present invention together with the controller 22.

The receiver 3, as shown in FIG. 1, is attached at the chassis 6 side of the vehicle 1, receives transmission frames sent from the transmitters 2, and performs various processing and computations etc. based on the detection signals stored in the frames so as to find the tire air pressure.

This receiver 3 is provided with the antennas 31 and controller (first controller) 32 shown in FIG. 1. The antennas 31 are provided in a number corresponding to the number of the tires, that is, the number of transmitters 2, and are placed at locations corresponding to the positions of the transmitters 2 at the chassis 6. For example, they are fastened to the chassis 6 at positions predetermined distances from the transmitters 2. Note that here an example is shown of a number of antennas 31 corresponding to the number of wheels being provided, but of course this number is just an example. For example, a single antenna may also be used to receive transmission frames sent from all of the transmitters 2.

The controller 32 of FIG. 1 is comprised of a known microcomputer and is designed to be started up upon receipt of power from a battery (not shown) carried at the chassis 6 side when for example an ignition switch (not shown) provided at the vehicle 1 is turned to the on position. This controller 32 performs predetermined processing in accordance with a program stored in a not shown memory built into it so as to detect tire air pressure from detection signals stored in received transmission frames.

Further, the display 4 is provided at a location visible to the driver, for example, is set in the instrument panel of the vehicle 1. This display 4 notifies the driver of the drop of tire air pressure by displaying that a signal indicating that the tire air pressure has dropped has been sent from the controller 32 of the receiver 3.

Next, the operation of the tire air pressure detection system of the present embodiment will be explained.

First, the normal operation when no strong electric field noise or strong radio interference is detected will be explained.

At normal times, since no strong electric field noise or strong radio interference is input to the detection circuit 24 through the radio interference detection antenna 26, a low level signal is output from the amplification circuit 25.

On the other hand, the controller 22 manages the transmission timings by itself, so confirms that no high level signal has been output from the amplification circuit 25 from the previous transmission timing to the current transmission timing, specifically until the timing for reading the sensor detection signals.

At this time, as explained above, since the output of the amplification circuit 25 remains at the low level at normal times, the controller 22 judges that it is possible to send transmission frames to the receiver 3 and outputs a power supply control signal indicating to turn the RF unit 23 on.

Due to this, the RF unit 23 is turned on and transmission frames storing detection signals are sent through the transmission antenna 27 toward the receiver 3.

Further, the receiver 3 receives the transmission frames sent from the transmitters 2 through the antennas 31 of FIG. 1, perform various processings and computations in accordance with a program by the controller 32, and detects the tire air pressure based on the detection signals in the transmission frames.

For example, when a detected tire air pressure is compared with a predetermined threshold value and a drop in the tire air pressure is detected, the controller 32 outputs a signal to that effect to the display 4 and notifies the driver of the drop in tire air pressure by the display 4. The operation for detection of tire air pressure is conducted in this way at normal times.

In this way, at normal times, the output of the amplification circuit 25 is the low level. Therefore, the transmission frames are sent from the controller 22 through the RF unit 23 and transmission antenna 27 at the transmission timings.

Note that at this time, the transmission antenna 27 emits a radio wave, so the radio interference detection antenna 26 may receive that radio wave and the detection circuit 24 may detect it as a strong electric field or strong radio interference. Therefore, in the present embodiment, if confirmed that the output of the amplification circuit 25 was the low level until right before the transmission timing, even if the output of the amplification circuit 25 becomes the high level at the transmission timing, the controller 22 judges that a strong electric field or strong radio interference was not detected. That is, when no strong electric field or strong radio interference was detected by the detection circuit 24 up until right before, it is assumed that there would be little chance that the environment changed suddenly and a strong electric field or strong radio interference would be detected and it is concluded that even if the output of the amplification circuit 25 becomes the high level at that timing, it does not mean a strong electric field or strong radio interference.

Due to this, even if a radio wave sent from the transmission antenna 27 is received by the radio interference detection antenna 26 at the transmission timing, it is possible to prevent the transmission of the transmission frames from being stopped.

Next, the operation at the time of an abnormality when a strong electric field noise or strong radio interference is detected will be explained.

At the time of an abnormality, the detection circuit 24 receives a strong electric field noise or strong radio interference through the radio interference detection antenna 26 and a high level signal is output from the amplification circuit 25.

On the other hand, the controller 22 confirms, in the same way as a normal instance, if a high level signal has been output from the amplification circuit 25 up until the current transmission timing. At this time, as explained above, a high level signal was output from the amplification circuit 25 at the same time as the sensor signal was read, so the controller 22 executes processing against radio interference. That is, the controller 22 judges that the timing is not one where transmission frames can be output toward the receiver 3 and outputs a power supply control signal turning the RF unit 23 off.

Due to this, the RF unit 23 is turned off and transmission frames are no longer sent. Therefore, the receiver 3 does not receive anything through the antennas 31 and does not detect tire air pressure. In this way, at the time of an abnormality, the output of the amplification circuit 25 becomes the high level and a power supply control signal for turning the RF unit 23 off is output from the controller 22. Therefore, even at the transmission timing, it is possible to prevent transmission frames from being sent through the RF unit 23 and the transmission antenna 27.

Note that, in this case, the receiver 3 does not receive any transmission frames when assuming the reception timing. Therefore, if such a situation continues for a predetermined period, it can be judged that a strong electric field or strong radio interference has been detected and therefore the situation is not one where data of the tire air pressure can be sent. In this case, for example, it is possible to display the fact that a strong electric field or strong radio interference has been detected and therefore the tire air pressure cannot be detected so as to bring this to the attention of the driver.

As explained above, in the tire air pressure detection system of this embodiment, when a strong electric field or strong radio interference is detected, transmission frames are not sent to the receiver 3 side even at the transmission timings. Therefore, even if a strong electric field or strong radio interference affects the detection signals from the first to n-th sensors, it is possible to prevent mistaken data relating to tire air pressure from being sent from the transmitters 2.

Second Embodiment

Next, a second embodiment of the present invention will be explained. The tire air pressure detection system of this embodiment differs from the first embodiment in the configuration of the transmitters 2. The rest of the parts are the same, so only the different parts will be explained.

Figure 3:
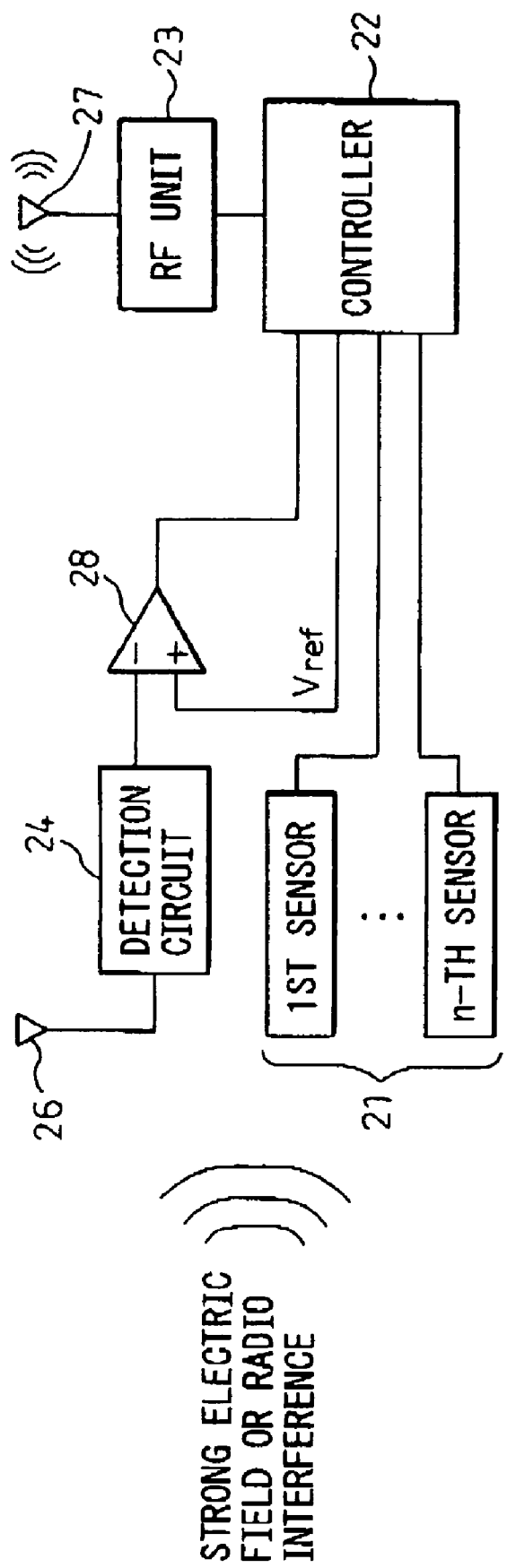
FIG. 3 is a view of the block configuration of a tire air pressure detection system according to a second embodiment of the present invention.

FIG. 3 shows the block configuration of a transmitter in the tire air pressure detection system of the present embodiment. As shown in the drawing, the transmitter 2 of the present embodiment differs from the first embodiment in the point of being provided with a comparator 28 instead of the amplification circuit 25 shown in FIG. 2 of the first embodiment.

The comparator 28 compares the magnitudes of a reference voltage Vref output from the controller 22 and the output of the detection circuit 24 to generate output in accordance with the result of detection. Specifically, the comparator 28 is designed to output a "low" level if the output of the detection circuit 24 is larger than the reference voltage Vref and a "high" level if it is smaller.

Here, the reference voltage Vref is suitably adjusted in accordance with the level of resistance to a strong electric field of the first to n-th sensors provided at the sensing unit 21 and is made a different value for each sensor.

In such a configuration, the reference voltage Vref set by the controller 22 is changed in accordance with the timing for reading the detection signal of each sensor, that is, is made a reference voltage Vref suitable for the level of resistance to a strong electric field of each sensor.

If the output of the detection circuit 24 becomes higher than the reference voltage Vref set matching the level of resistance to a strong electric field of the sensor in question, it is considered that the detection signal of that sensor may be affected by a strong electric field or strong radio interference, so that a low level signal is made to be output from the comparator 28. Receiving this, the controller 22 outputs a power supply control signal indicating to turn off the RF unit 23, whereby transmission frames are not sent to the receiver 3 side even at the transmission timing.

As explained above, if judging that a detection signal of a sensor may be affected by a strong electric field or strong radio interference in accordance with the level of resistance to a strong electric field of each sensor, it becomes possible to prevent mistaken diagnosis in accordance with the level of resistance to a strong electric field of each sensor.

Other Embodiments

In the above embodiments, the radio interference detection antenna 26 and the transmission antenna 27 were configured separately, but these may be also combined to a common antenna.

In the above embodiments, when there was a possibility of a detection signal of a sensor being affected by a strong electric field or strong radio interference, the controller 22 output a power supply control signal to turn the RP unit 23 off, but it is also possible to provide the receiver 3 side with a strong electric field detecting means able to detect the occurrence of a strong electric field or strong radio interference.

In this case, if the receiver 3 detects a strong electric field or strong radio interference, it can judge that tire air pressure data sent from the transmitters 2 at that time is low in reliability. Accordingly, in such a case, for example, it can stop detection of tire air pressure or display to the driver the fact that a strong electric field or strong radio interference has been detected and therefore data relating to tire air pressure cannot be obtained or the fact that the reliability of the tire air pressure detected at that time is low.

Further, it is also possible not to have the controller 22 output a power supply control signal for turning off the RF unit 23, but to have the controller 22 output a power supply control signal for turning on the RF unit 23 and convert the transmission frames to predetermined dummy data to be sent to the receiver 3 side.

In this case, the receiver 3 would receive this dummy data and could display the fact that the data was produced for a time when a strong electric field or strong radio interference was detected and therefore the accuracy cannot be guaranteed. Further, detection of tire air pressure could be suspended since the received data is dummy data. By using dummy data for transmission in this way, the demerit, i.e., it being unable to determine (i) if a transmitter is not sending data because it has detected a strong electric field or (ii) if a transmitter is not sending data because it has malfunctioned, can be eliminated.

In the above embodiments, when a strong electric field or strong radio interference is detected, it is also possible to stop the reading of the detection signals from the sensors and start the read operation again when the strong electric field or strong radio interference is no longer detected.

While the invention has been described with reference to specific embodiments chosen for purpose of illustration, it should be apparent that numerous modifications could be made thereto by those skilled in the art without departing from the basic concept and scope of the invention.

What is claimed is:

1. A tire air pressure detection system comprising:
    a transmitter provided at each of a plurality of wheels provided with tires, having a sensing unit for detecting data relating to air pressure of a corresponding tire, and sending out a detection signal of that sensing unit and
    a receiver provided at a chassis side and provided with a first controller receiving detection signals and finding the air pressures of the tires provided at the plurality of wheels based on the detection signals, wherein
    each transmitter has a strong electric field detecting function unit for detecting a strong electric field or strong radio interference and a second controller for receiving as input the detection signal of the sensing unit and sending a transmission signal toward the receiver at predetermined transmission timings, and the second controller is operative to stop a detection signal from being transmitted to the receiver at a current transmission timing when the strong electric field detecting function unit detects a strong electric field or strong radio interference in the interval from a previous communication timing to a current communication timing.

2. A tire air pressure detection system as set forth in claim 1, wherein each second controller sends out a detection signal at a current transmission when the strong electric field detecting function unit fails to detect a strong electric field or radio interference from the previous transmission timing to the current transmission timing and judges that a radio wave is one transmitting a detection signal even when the strong electric field detecting function unit detects a strong electric field or radio interference at the current transmission timing.

3. A tire air pressure detection system as set forth in claim 1, wherein:

the system is provided with a display for displaying information relating to said tire air pressure, and the receiver can display by the display the fact that a strong electric field or radio interference prevents detection of tire air pressure when failing to receive a detection signal from a transmitter regardless of it being the current transmission timing.

4. A tire air pressure detection system as set forth in claim 1, wherein:

each transmitter has a radio unit turned on/off upon receiving a power supply control signal from its second controller, the radio unit being turned on when a detection signal is to be sent from the second controller toward the receiver, and each second controller is operative to output a power supply control signal turning the radio unit off when the strong electric field detecting function unit detects a strong electric field or radio interference.

5. A tire air pressure detection system comprising:

a transmitter provided at each of a plurality of wheels provided with tires, having a sensing unit for detecting data relating to air pressure of a corresponding tire, and sending out a detection signal of that sensing unit and a receiver provided at a chassis side and provided with a first controller receiving detection signals and finding the air pressures of the tires provided at the plurality of wheels based on the detection signals, wherein each transmitter has a strong electric field detecting function unit for detecting a strong electric field or radio interference and a second controller for receiving as input a detection signal of a sensing unit and sending a transmission signal toward the receiver at a predetermined transmission timing, and each second controller is operative to send dummy data different from a detection signal to the receiver at a current transmission timing when the strong electric field detecting function unit detects a strong electric field or radio interference in the interval from the previous communication timing to the current communication timing.

6. A tire air pressure detection system as set forth in claim 5, wherein:

the system is provided with a display for displaying information relating to said tire air pressure, and the receiver can display on the display the fact that a strong electric field or radio interference prevents tire air pressure from being detected.

7. A tire air pressure detection system as set forth in claim 1, wherein said strong electric field detecting function unit has a detection circuit for detecting a radio wave having a predetermined electric field strength as a strong electric field or radio interference.

8. A tire air pressure detection system as set forth in claim 5, wherein said strong electric field detecting function unit has a detection circuit for detecting a radio wave having a predetermined electric field strength as a strong electric field or radio interference.

9. A tire air pressure detection system as set forth in claim 1, wherein:

each sensing unit is provided with a plurality of sensors and is designed to output detection signals from the plurality of sensors, and each strong electric field detecting function unit is provided with a function unit for changing a level by which a strong electric field or radio interference is detected in accordance with levels of resistance to a strong electric field at the plurality of sensors.

10. A tire air pressure detection system as set forth in claim 5, wherein:

each sensing unit is provided with a plurality of sensors and is designed to output detection signals from the plurality of sensors, and each strong electric field detecting function unit is provided with a function unit for changing a level by which a strong electric field or radio interference is detected in accordance with levels of resistance to a strong electric field at the plurality of sensors.

* * * * *